June 7, 1955   C. E. FORSYTHE   2,709,901
FLEXIBLE COUPLING
Filed March 18, 1953
Fig. 1.
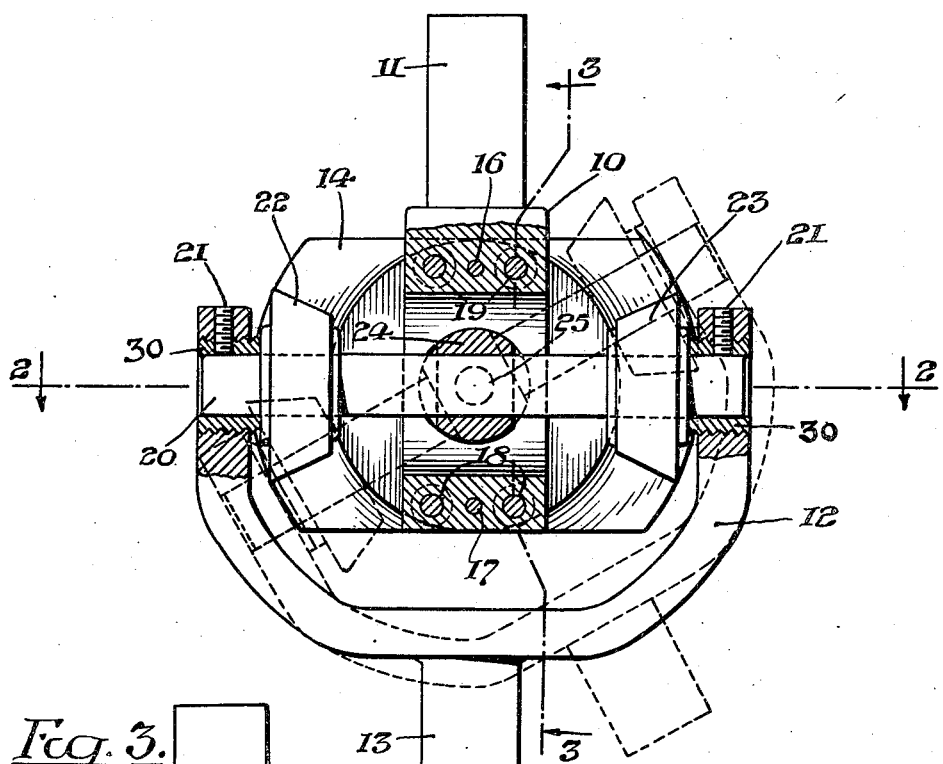
Fig. 3.
Fig. 2.
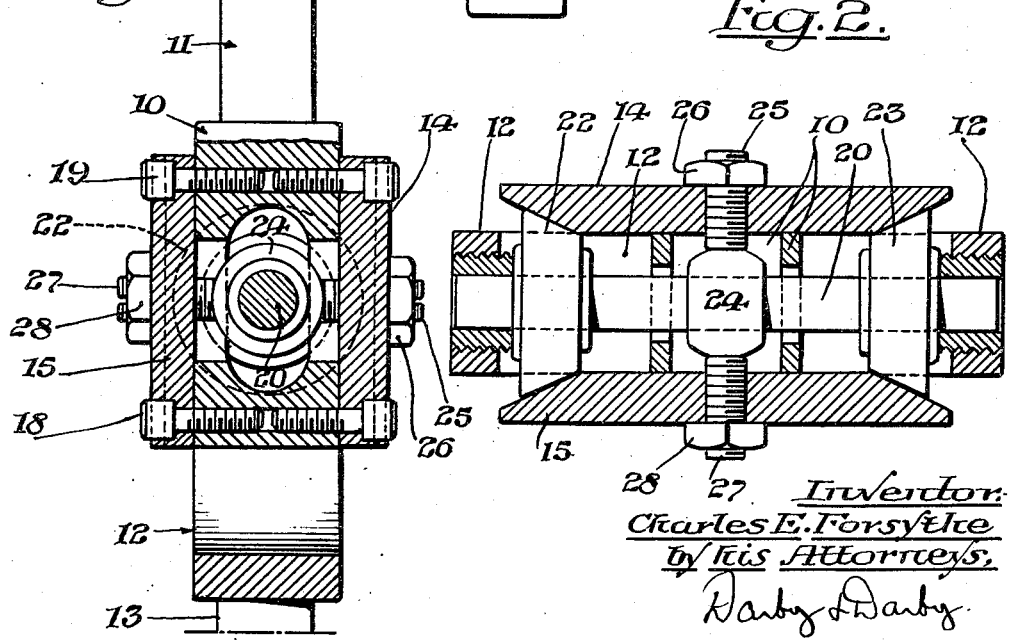
Inventor:
Charles E. Forsythe
by his Attorneys,
Darby & Darby

United States Patent Office 2,709,901
Patented June 7, 1955

2,709,901

FLEXIBLE COUPLING

Charles E. Forsythe, Stony Brook, N. Y.

Application March 18, 1953, Serial No. 343,088

1 Claim. (Cl. 64—7)

This invention relates to improvements in flexible couplings or universal joints used for transmitting power rotationally.

One object of this invention is to provide a structurally simple universal joint which is capable of withstanding substantial stresses for a given size.

Another object of the invention is to provide a coupling of this type which is capable of transmitting power rotationally at angles between the driving and driven shafts, which is substantially greater than that ordinarily available in devices of this kind.

Still another object of the invention is to provide a universal joint structure in which the driving forces are balanced and by means of a structure which is composed of a relatively few simple parts.

Other and more detailed objects of the invention are incident to the construction herein disclosed by way of illustration.

In the accompanying drawings,

Figure 1 is a horizontal, central, cross-sectional view (partly in elevation) through the structure of this invention;

Figure 2 is a cross-sectional view taken on the line 2—2 of Figure 1;

Figure 3 is a cross-sectional view (partly in elevation) taken on the line 3—3 of Figure 1.

The device consists of two yokes which for descriptive purposes may be termed the driving and the driven yokes. As it is understood in this art, power may be transmitted in either direction through the structure so that the above terms are merely for descriptive facility.

Thus the driving yoke 10, which is generally rectangular in elevation, is provided with a stub shaft 11 by means of which the yoke can be connected to a power source. Similarly, the driven yoke 12 is provided with a stub shaft 13 to be connected to the driven device, which yoke can be characterized as Y-shaped. An opposite pair of faces of the yoke 10 are flat and parallel and have attached thereto a pair of plates 14 and 15 which are positioned by means of dowel pins 16 and 17 and attached to the yoke by means of the pairs of bolts 18 and 19. As is clear particularly from Figure 2, the opposed faces of the plates 14 and 15 have a pair of segmental bearing surfaces which are conical. It is contemplated that the yoke 10 and plates 14 and 15 may be made in a single piece, as a forging, for example.

The ends of the yoke 12 have a pair of aligned apertures in which the respective ends of a shaft 20 are held by means of set screws 21. Mounted upon this shaft so as to cooperate with the conical bearing surfaces of the plates 14 and 15, are a pair of conical rollers 22 and 23, which are preferably mounted on anti-friction bearings. The conical bearing surfaces and rollers 22 and 23 are arranged in a balanced relation and are spaced longitudinally on the shaft 20 by cooperation with the conical bearing surfaces of the plates 14 and 15. If desired, as shown, the ends of shaft 20 may be seated in a pair of threaded bushings 30, through which the set screws 21 pass to engage the shaft ends. These bushings are initially adjusted to engage the ends of the rollers 22 and 23 to position them on the conical slots of the plates 14 and 15.

The shaft 20 passes through a spherical ball 24 which has flattened sides. This ball lies in an open ended chamber formed in the yoke 10. Bearing upon the ball at a pair of diametrically spaced points are a pair of pins 25 and 27 which are threadedly mounted in the plates 15 and 14. The ends of the pins are cup shaped so as to have the same radius as that of the ball 24. A pair of lock nuts 26 and 28 serve to lock the threaded pins 25 and 27 in correct position.

The operation of the device is clear from the drawings. It need only be noted that the ball 24, which is permitted freedom of rotational movement between the cupped ends of the screws 25 and 26, provides a means for holding the two yoke members in proper centered longitudinal relationship. These yokes, of course, are held laterally in the proper lateral relationship by the cooperation of the conical rollers with the conical bearing seats. This structure provides a balanced arrangement which permits of transmitting forces rotationally through a considerable angle, as is apparent from Figure 1.

Since the details of construction of this device can be varied within limits by those who understand devices of this kind, I do not wish to be limited to the specific embodiment selected for illustrative purposes.

What is claimed is:

A universal coupling comprising a driving yoke having a pair of parallel plates with aligned conical rolling surfaces, a driven yoke, a shaft mounted in said driven yoke, a pair of opposed independently rotatable conical rollers rotatably mounted on said shaft and engaging said rolling surfaces, a spherical ball mounted on said shaft, and means comprising a pair of axially adjustable members mounted on said plates and engaging two diametrically aligned spherical surface portions of said ball to permit rotation of the driven yoke on an axis at right angles to said plates.

References Cited in the file of this patent

UNITED STATES PATENTS

| | | |
|---|---|---|
| 1,836,987 | Peake | Dec. 15, 1931 |
| 2,079,622 | La Rose | May 11, 1937 |
| 2,626,511 | Forsythe | Jan. 27, 1953 |